May 17, 1955 — T. JAMIESON — 2,708,712
ILLUMINATED WHEEL MOUNTING GUIDE
Filed Oct. 17, 1950
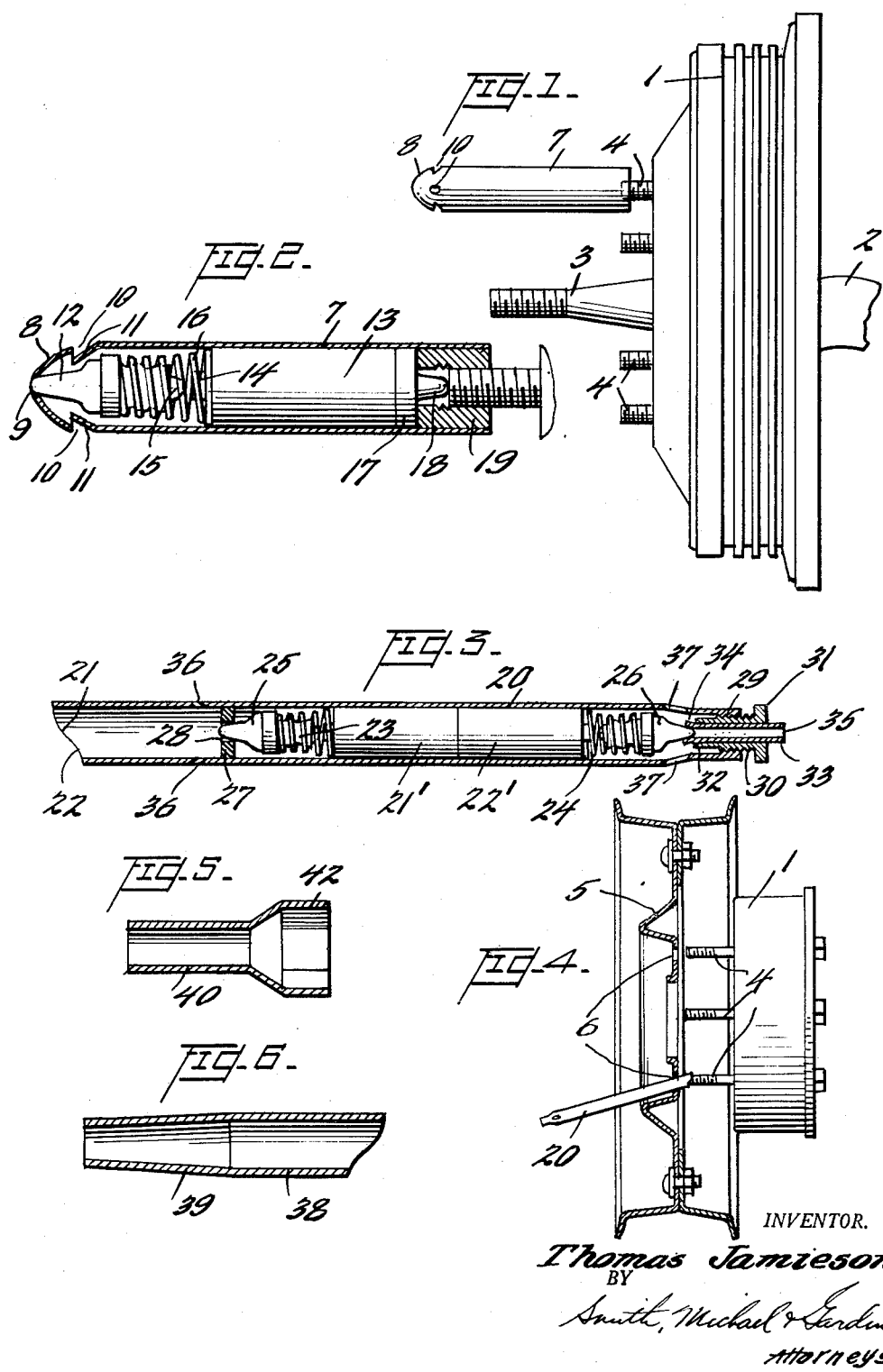
INVENTOR.
Thomas Jamieson,
BY
Smith, Michael & Gardine
Attorneys

United States Patent Office 2,708,712
Patented May 17, 1955

2,708,712
ILLUMINATED WHEEL MOUNTING GUIDE
Thomas Jamieson, Holland, Pa.

Application October 17, 1950, Serial No. 190,603

3 Claims. (Cl. 240—6.46)

This invention relates to wheel mounting guides, and is more particularly directed to guides for aligning the bolt holes of a wheel with the securing bolts by means of which the wheel is secured to its support.

As an example of the utility of the present invention, the guide is useful in aligning the bolt holes of an automobile wheel with the bolts which are normally carried by the brake housing and which are obscured by the wheel during the act of replacing the wheel on the bolts.

It is well known that in present day practice, the wheels of automobiles are removed and the tires then removed from the rim in case of flat tires, after which the repaired tire is mounted on the rim and the wheel is then positioned so that the bolt openings align with the bolts, after which the wheel is secured by nuts threading on the bolts. The wheels and rims are relatively heavy, and in muddy and inclement weather, the operation of mounting the wheels is very irksome if not difficult due to the fact that the wheel obscures the bolts and must be rotated back and forth while being lifted up in order to properly align the bolts with the bolt holes. The task is even more bothersome at night time or in dark localities, so that the present invention is designed to facilitate the operation of remounting wheels of the type heretofore mentioned, so that it can be done quickly and accurately and without the necessity of seeking the proper alignment.

The primary object of the present invention is to provide a wheel mounting guide that is provided with illuminating means which is clearly visible to the party seeking to remount the wheel so that the bolt holes can be quickly aligned with the wheel supporting bolts.

Another object is to provide means for illuminating the area surrounding the bolt carrying surfaces so that in darkness the aligning operation is facilitated.

Another object of the present invention is to provide a wheel guide which, while embodying the illuminating features heretofore mentioned, also assists in moving the wheel to properly align the bolts and bolt holes.

An additional object is to provide means for automatically illuminating the guide as it is secured to the wheel receiving bolt, and in one form of the invention, an additional object is to provide means for locking the switching mechanism in position so that the illuminating means will be energized even after the guide has been removed from the bolt so that this source of illumination may be used in furthering the operation of securing the wheel to its support.

Still another object is to provide adapters for the guide so that it can be used with bolts of varying diameters and by means of which the guide may be supported on the wheel supporting surface so that the beams of light may illuminate the involved area.

Referring to the drawings,

Fig. 1 is a fragmentary elevation illustrating an automobile brake housing, the wheel attaching bolts and the wheel mounting guide secured to one of said bolts;

Fig. 2 is a longitudinal sectional view through one form of wheel mounting guide;

Fig. 3 is a longitudinal sectional view of another form of wheel mounting guide;

Fig. 4 is a fragmentary sectional view illustrating the manner of using the wheel guide of Fig. 3;

Figs. 5 and 6 are longitudinal sectional views of different forms of adapters which are used in connection with the form shown in Fig. 3.

In the drawings, the numeral 1 indicates a brake housing and the usual axle 2, and hub 3 are shown.

Conventionally, the brake housing is provided with a plurality of bolts 4 projecting therefrom which are for the purpose of supporting the wheel adjacent the brake housing.

As shown in Fig. 4, the wheel is provided with a central web 5 provided with apertures 6 which receive the bolts 4 after which securing lugs are threaded on the bolts to hold the wheel securely in position.

As will be obvious from an inspection of Fig. 4, the bolts 4 are obscured from view by the central web 5 of the wheel so that the operation of aligning the bolt holes 6 with the bolts 4 is carried out by lifting the wheel and then rotating the same back and forth until the bolt is visible through the bolt hole, after which the wheel is shoved home on the bolts.

In order to facilitate this operation, the present invention embodies an illuminating guide consisting of a tubular metallic body member 7 terminating at its forward end in a round dome 8 which is provided with a central aperture 9 and a plurality of spaced louvers 10.

As illustrated in Fig. 2, the louvers consist of tapered slots or perforations with the inwardly bent walls 11 facing toward the domed end 8 so that beams of light from the electric bulb 12 are thrown rearwardly toward the brake housing 1.

Carried in the tubular body member 7 is a battery 13 which is slidably mounted in the body 7 and has its terminal 14 spaced from the lamp bulb terminal 15 by means of a coil spring 16 which as shown contacts the base of the bulb 15 and the interior of the metallic body member 7.

It will be obvious that as long as the battery terminal 14 and the lamp base terminal 15 are separated, no current will flow from the battery to the bulb. However, the interior of the body 7 carries a slidable plug 17 which contacts the base of the battery 13 and is provided with a rearwardly projecting button 18 which is adapted to contact the wheel mounting bolt 4 when the guide is in operative position. At the rear end of the body portion 7 is an internally threaded bushing 19 of a diameter corresponding to the diameter of the bolt 4. This bushing 19 frictionally engages the interior walls of the body member 7, but may be removed therefrom in order to replace the battery 13 or bulb 12 when required. It is thought that the manner of use of this form of the invention is obvious.

When the bushing 19 is threaded onto the bolt 4, the end of the bolt engages the button 18 and forces the battery 13 forwardly until the battery terminal 14 engages the lamp base terminal 15 at which time the bulb is lighted in order that a target may be provided to facilitate aligning the bolt holes in the wheel with the securing bolts.

It will be noted that the forward end of the bulb 12 projects slightly through the aperture 9 so that the illuminated end of the bulb is clearly visible to the person remounting the wheel. At the same time, the beams of light from the bulb are directed rearwardly or toward the brake drum through the louvers 10 so that the operation of remounting the wheel is greatly facilitated.

Referring now ot Fig. 3, the same general concept is present, but in this particular example instead of using a fixed body member or casing, a tubular fulcrum rod is used comprising the tubular metal casing 20 having one of its ends open as at 21 and having its forward edge beveled rearwardly and downwardly as at 22 in order to facilitate engagement of the tubular casing over the end of a wheel securing bolt.

The manner of using this form of the invention is clearly shown in Fig. 4 in which it will be seen that the tubular rod has been passed through one of the bolt holes and engaged over the end of one of the wheel securing bolts. As shown, the tubular rod is at an angle to the axis of the bolt so that by lifting the free end of the rod, the wheel is fulcrumed upwardly and also laterally in order that the bolt and bolt hole may properly align, after which the wheel is moved along the rod 20 and onto the bolt.

As in the case of the guide shown in Fig. 2, the guide of Fig. 3 is likewise provided with illuminating means consisting of the batteries 21' and 22' with their bases abutting, coil springs 23 and 24 similar to the spring 16 of Fig. 2, and the lamp bulbs 25 and 26, it being understood that the springs 23 and 24 space the batteries from the lamp bulb terminals in the same manner as described in connection with Fig. 2.

Within the tubular casing 20 an apertured plug 27 is provided and is located within the casing at a point removed from the open end in order to permit the wheel bolt to be received in the socket formed thereby. The end of the lamp bulb 25 projects through the aperture 28 so that beams of light are directly visible through the open end 21 of the tubular rod 20.

At the opposite end, the tubular casing 20 is reduced in diameter and internally threaded as at 29 to receive a threaded shank 30 of a locking knob 31, it being noted that the inner end of the shank is beveled as at 32 for a purpose to be described later.

The operating plunger 33 is slidably mounted in the hollow shank 30 and extends therethrough and has its inner end flared outwardly as at 34 for engagement with the top of the bulb 26. This plunger 33 is hollow and is provided with an aperture 35 at its rear end through which the light 26 is visible.

As will be apparent, movement of the plunger 33 to the left as viewed in Fig. 3 will force the bulb 26 into contact with the battery 22' and further movement of the plunger will cause the batteries to slide in the tubular housing to cause contact between the battery 21' and lamp 25, thereby illuminating both bulbs.

When it is desired to retain the bulbs in illuminated position, it is merely necessary to screw inwardly on the locking knob 31, whereupon the flared ends 32 of the shank 30 engage the flared end 34 of the plunger and lock the plunger in its depressed condition, consequently maintaining the lights in contact with the battery.

The tubular member 20 is provided with a plurality of apertures or louvers 36 adjacent the forward end thereof and likewise with additional apertures 37 adjacent the opposite end, all of these apertures being inclined so as to throw the light from the bulb toward the brake housing so as to illuminate the area in which the work is being done, and it will be understood that in connection with both Figures 2 and 3, additional light emitting apertures or louvers may be provided wherever found desirable.

In Figs. 5 and 6 there are illustrated two different forms of adapters, the adapter in Fig. 6 consisting merely of a tubular member 38 having its end beveled in the same manner as the end 22 of Fig. 3 and has its opposite end tapered as at 39 so as to fit into the forward end of the tubular casing 20 of Fig. 3 in order that the guide may be used in connection with bolts of varying diameters, it being noted that since this adapter is hollow, the light rays from the bulb 25 will be visible through the adapter and the hollow end 21 of the casing 20.

The adapter shown in Fig. 5 likewise consists of a hollow tubular body 40 to be received within the open end of the casing 20 and has its other end enlarged to form a hexagonal socket 42 by means of which the guide as shown in Fig. 3 may be supported on a nut carried by the bolts in order that illumination may be provided at the desirable area.

From the foregoing, it will be seen that there has been provided an extremely simple and relatively inexpensive wheel mounting guide which, although quite small, and which therefore can be readily carried in the car, nevertheless provides a device which may be quickly assembled on the wheel mounting bolts and which prevents the awkward and cumbersome handling or twisting of the wheel in an effort to properly align the bolt holes and bolts for final assembly.

I claim:

1. An illuminated wheel mounting guide comprising a single elongated tubular lever having an unobstructed open end to fit over a wheel supporting bolt, spaced electric lamp bulbs in said lever and batteries for illuminating said bulbs with one of said bulbs being positioned to project light through said open end, said light being spaced from said open end to provide an unobstructed socket to receive the wheel supporting bolt, said lever having openings therethrough adjacent said spaced bulbs, said openings being inclined toward said open end of the lever, and means for connecting said bulbs and batteries.

2. An illuminated wheel mounting guide comprising an elongated hollow lever having an open end, a plug in said lever spaced from one end thereof and provided with a central aperture, an electric light bulb within said lever having a portion thereof projecting through said aperture, a second bulb within said lever spaced from the first bulb, batteries within said lever lying between said bulbs and normally out of electrical contact therewith, spring means between the batteries and bulbs to maintain said bulbs and batteries out of electrical contact, said batteries and second bulb being slidable against the action of the springs to produce electrical contact between the bulbs and batteries to illuminate the bulbs and means engageable with said second bulb to cause said sliding movement.

3. An illuminated wheel mounting guide comprising an elongated hollow lever having an open end, a plug in said lever spaced from said open end thereof and provided with a central aperture, an electric light bulb within said lever having a portion thereof projecting through said aperture to project light through the open end, a second bulb within said lever spaced from the first bulb, batteries within said lever lying between said bulbs and normally out of electrical contact therewith, spring means between the batteries and bulbs to maintain said bulbs and batteries out of electrical contact, said batteries and second bulb being slidable against the action of the springs to produce electrical contact between the bulbs and batteries to illuminate the bulbs and means engageable with said second bulb to cause said sliding movement, said lever being provided with light emitting apertures spaced therearound adjacent the location of said bulbs.

References Cited in the file of this patent

UNITED STATES PATENTS

| | | |
|---|---|---|
| 1,106,828 | Monaghan | Aug. 11, 1914 |
| 1,384,405 | Putnam | July 12, 1921 |
| 1,603,985 | Rosenberg | Oct. 19, 1926 |
| 1,919,024 | Abbotts | July 18, 1933 |
| 2,109,976 | Pierce | Mar. 1, 1938 |
| 2,134,081 | Gaede | Oct. 25, 1938 |
| 2,150,644 | Batcheller | Mar. 14, 1939 |
| 2,208,498 | Cramer | July 16, 1940 |
| 2,208,883 | Hall | July 23, 1940 |
| 2,261,320 | Williams | Nov. 4, 1941 |
| 2,288,093 | Kaffenberger et al. | June 30, 1942 |
| 2,341,375 | Hambelton | Feb. 8, 1944 |
| 2,525,414 | Kleinschmidt | Oct. 10, 1950 |

FOREIGN PATENTS

| | | |
|---|---|---|
| 617,253 | France | 1927 |
| 434,768 | Great Britain | Sept. 9, 1935 |